United States Patent [19]
Choi

[11] Patent Number: 5,600,508
[45] Date of Patent: Feb. 4, 1997

[54] CASSETTE LOADING APPARATUS WHICH UTILIZES THE DRIVING FORCE OF MOTOR INSTALLED IN TAPE DRIVING MECHANISM

[75] Inventor: Myoung-Soo Choi, Anyang City, Rep. of Korea

[73] Assignee: Samsung Electronics Co., Ltd., Kyungki-do, Rep. of Korea

[21] Appl. No.: 343,982

[22] Filed: Nov. 18, 1994

[30] Foreign Application Priority Data

Nov. 23, 1993 [KR] Rep. of Korea .................... 93-25008

[51] Int. Cl.⁶ .................................................. G11B 5/008
[52] U.S. Cl. ............................................................. 360/96.5
[58] Field of Search ...................... 360/96.5, 85

[56] References Cited

U.S. PATENT DOCUMENTS 5,371,641  12/1994  Kim ........................................ 360/96.5

Primary Examiner—A. J. Heinz
Attorney, Agent, or Firm—Sughrue, Mion, Zinn, Macpeak & Seas

[57] ABSTRACT

A cassette loading apparatus, for loading a cassette onto a tape driving mechanism of a videocassette recorder, includes a master gear rotated by a motor installed in the tape driving mechanism, a first slide member that moves by the rotation of the master gear, a second slide member locked to the first slide member so as to move together with the first slide member, and an arm gear that rotates by the movement of the second slide member to thereby move a cassette holder. The locking state of the first and second slide members is released when cassette loading ends, whereupon drive power is transmitted to the tape driving mechanism via the master gear and first slide member. The structure of the apparatus is simplified for more efficient use of the drive power of the motor and quicker cassette loading.

4 Claims, 7 Drawing Sheets

CASSETTE LOADING APPARATUS WHICH UTILIZES THE DRIVING FORCE OF MOTOR INSTALLED IN TAPE DRIVING MECHANISM

BACKGROUND OF THE INVENTION

1. Field of the Invention

The present invention relates to a cassette loading apparatus for automatically loading a cassette into a tape driving mechanism and, more particularly, to a cassette loading apparatus which uses the driving force of a motor provided in the tape driving mechanism.

2. Description of the Related Art

Videocassette recorders generally comprise a cassette loading mechanism for loading a cassette and a tape driving mechanism for performing such functions as drawing the tape from a loaded cassette and travelling a tape for recording and reproducing information with respect thereto. In this case, although there are various types of cassette loading mechanisms, most videocassette recorders for home use adopt a front-loading type system. Such a cassette loading mechanism adopting the front loading system generally includes a cassette holder for holding an inserted cassette, a guide for movably supporting the cassette holder so that the cassette holder can move horizontally and vertically in stages, and driving means (a motor) for moving the cassette holder.

U.S. Pat. No. 4,951,164 discloses a technique for using the driving force of a motor installed in the tape driving mechanism, without an additional motor for operating the cassette loading mechanism. In particular, the tape driving mechanism comprises a head drum for use in recording and reproducing, a capstan for travelling the tape, a pinch roller, a deck having a reel driving table for driving a tape reel in the loaded cassette, and a motor for providing the deck with a drive force, such that the operational state of each part can be converted according to a mode selection.

In order to operate a cassette loading mechanism by employing the driving force of the motor installed in the tape driving mechanism, the tape driving mechanism should not be operated when cassette loading is in progress. Thus, after cassette loading, the tape driving mechanism is operated while maintaining the cassette-loaded state. With such a driving portion constituted as in the aforementioned U.S. patent, a worm wheel has a toothless portion which is secured to the motor shaft and a rack is employed for delivering the driving force of the motor to the cassette loading mechanism from the worm wheel. That is, when a cassette is first inserted, the worm and the worm wheel mesh and rotate together, so that the cassette loading mechanism loads the inserted cassette onto the deck. With the cassette thus-loaded, the worm is placed on the toothless portion of the worm wheel, such that the driving force is no longer delivered to the cassette loading mechanism but delivered to the tape driving mechanism.

In the cassette loading mechanism as described above, after the completion of a cassette loading operation, the toothless portion of the worm wheel faces the worm while the tape driving mechanism is actuated. Additionally, in order to eject a cassette, some means for rotating the worm wheel is needed so that the worm wheel and the worm can be re-connected in the above-described state. The realization of such means, however, is extremely complex, making assembly difficult. Moreover, numerous intermediate gears are needed for linking a cassette holder to the rack. Accordingly, there is excessive power loss in the drive train and cassette loading is slow.

SUMMARY OF THE INVENTION

Accordingly, it is an object of the present invention to provide a cassette loading apparatus having a simplified structure, in which a portion for connecting a cassette holder to a motor is greatly improved for enhanced assembly.

It is another object of the present invention to provide a cassette loading apparatus having less drive power loss and which enables quick loading.

To accomplish the object of the present invention, there is provided a cassette loading apparatus, including a cassette holder for receiving a cassette, and a motor for generating a driving force, and which moves the cassette holder by the driving force of the motor, so as to load the cassette onto a deck for travelling the tape in the cassette, the apparatus comprising: a master gear coupled to and rotated by the motor; a first slide member having a first rack gear coupled to the master gear, and being moved by the rotation of the master gear; a second slide member having a second rack gear, and being supported by and movable on the first slide member; an arm gear which is meshed with the second rack gear of the second slide member and coupled to the cassette holder, and which rotates in accordance with the movement of the second slide member and thereby moves the cassette holder; and means for locking the first and second slide members so as to move together in a locked state during cassette loading and ejecting, and for releasing the locked state after cassette loading.

BRIEF DESCRIPTION OF THE DRAWINGS

The above objects and other advantages of the present invention will become more apparent by describing in detail preferred embodiments thereof with reference to the accompanying drawings, in which.

DETAILED DESCRIPTION OF THE PREFERRED EMBODIMENTS

The present invention will be explained in more detail with reference to the attached drawings.

Figure 1:
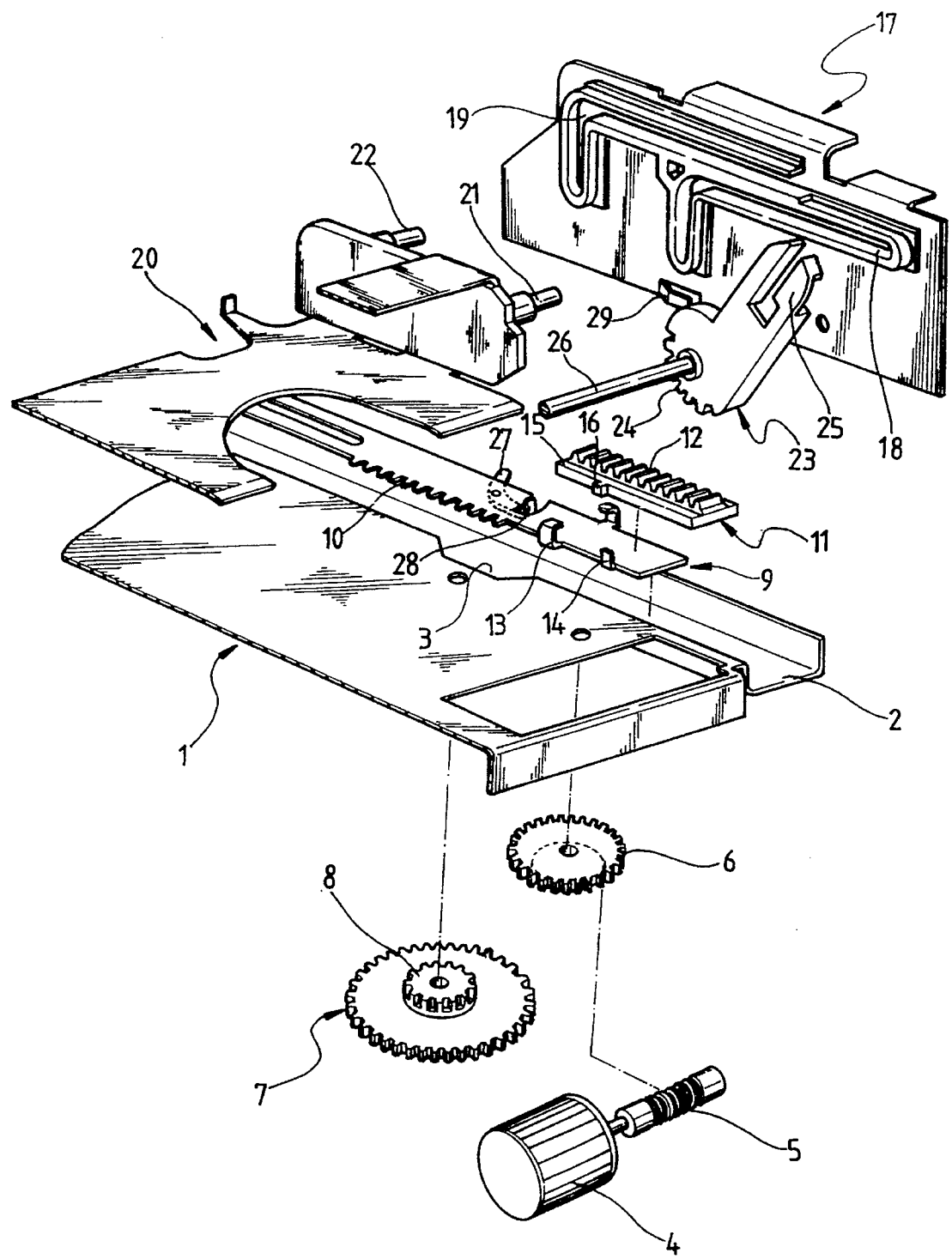
FIG. 1 is a partially exploded perspective illustration of a cassette loading apparatus according to an embodiment of the present invention.

FIGS. 1 to 5 concern a first embodiment of the present invention. Referring to FIG. 1, reference number 1 denotes a deck of a tape driving mechanism. A concave channel 2 and an opening 3 connected to the channel 2 are formed at one end of deck 1. In addition, a motor 4 for generating a driving force is provided on the deck 1, and a head drum, capstan, pinch roller and a reel driving table (which are not shown) are placed on the deck 1. A worm 5 is secured to a shaft of the motor 4 and a worm wheel 6 and a master gear 7 are sequentially meshed to the worm 5. Master gear 7 includes a gear portion 8 having a small diameter and being integrally formed with master gear 7. Part of the gear portion 8 is installed to protrude into channel 2 via the opening 3.

A first slide member 9 is installed in the channel 2 of the deck 1. First slide member 9 comprises a rack gear 10 coupled to master gear 7 and gear portion 8 and is installed to be slid on the channel 2 of deck 1 in accordance with a rotation of master gear 7. A second slide member 11 is installed to be slid on first slide member 9 and has a rack gear portion 12 formed in an upper surface thereof. Here, guide protrusions 13, 13 are formed on the first slide member 9 and a guide rail 15 is formed on the second slide member 11 so that the second slide member 11 can be slid without deviating from first slide member 9.

A guide bracket 17 is supported on the side surface of the deck 1 by means of a screw (not shown). Guide bracket 17 includes guide grooves 18 and 19 formed so as to support guide pins 21 and 22 of a cassette holder 20 to be movable. An arm gear 23 comprises a gear portion 24 meshed with the rack gear portion 12 of second slide member 11 and an arm portion 25 coupled to the guide pin 21 of the cassette holder 20. A shaft 26 fixedly secured to the center of gear portion 24 is supported by the guide bracket 17 to be rotatable. Arm gear 23 rotates by the movement of the second slide member 11, thereby moving cassette holder 20.

During cassette loading and ejecting operations, a locking lever 27 mounted on the first slide member 9, a stop 14, a protrusion 16 formed on the second slide member 11 and a cam 29 formed on guide bracket 17 operate as locking/releasing means for locking the first and second slide members 9 and 11 so as to move together and releasing the locked state when cassette loading ends. Locking lever 27 is pivot-supported to the bottom surface of the first slide member 9 and has a bent portion 28 which protrudes above the first slide member 9 (see especially FIGS. 3 and 4) via a cut-out portion (unnumbered) of the first slide member 9. Locking lever 27 is biased by a spring (not shown) so that the bent portion 28 can be brought to the position where the bent portion 28 can push against second slide member 11. Cam 29 projecting from the guide bracket 17 is operative to engage with the lock lever 27 so that the bent portion 28 of the locking lever 27 can deviate from the center upon the completion of cassette loading. In other words, the locked state of the first and second slide members 9 and 11 is released when locking lever 27 is engaged with cam 29. Protrusion 16 is caught by the stop 14 but freely passes the guide protrusion 13 which is situated on the same side of the first slide member 9 as the stop 14.

Moreover, while one side of a cassette loading apparatus is shown in the drawings, a similar guide bracket and arm gear are provided symmetrically at the other side of cassette loading apparatus.

Figure 2:
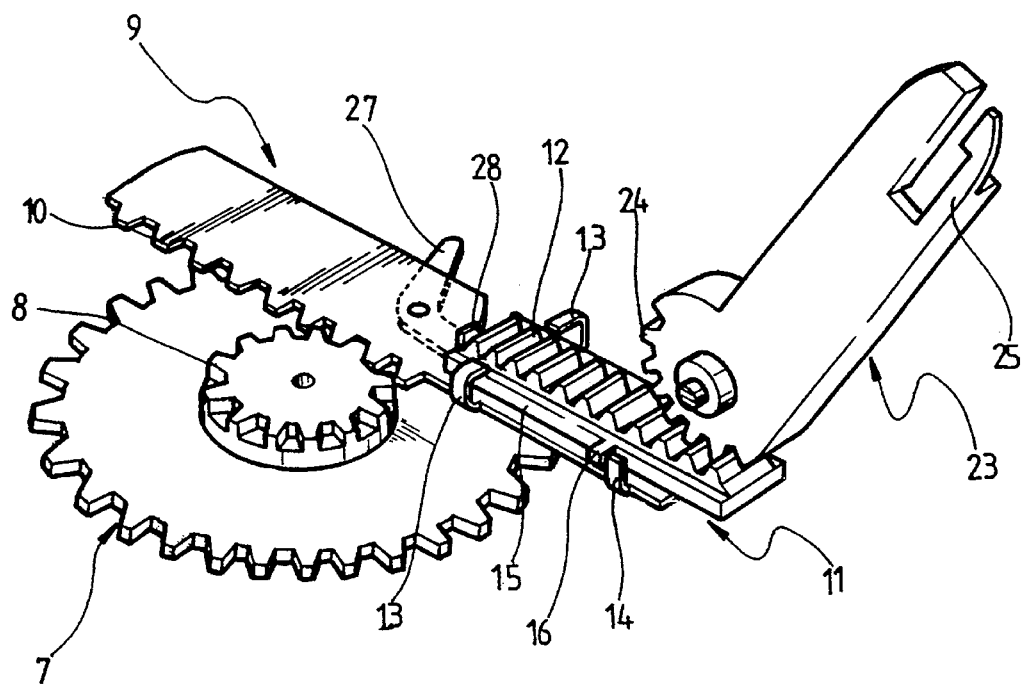
FIG. 2 is a perspective view of parts of the cassette loading apparatus shown in FIG. 1, illustrating the cassette-ejected state thereof.
Figure 3:
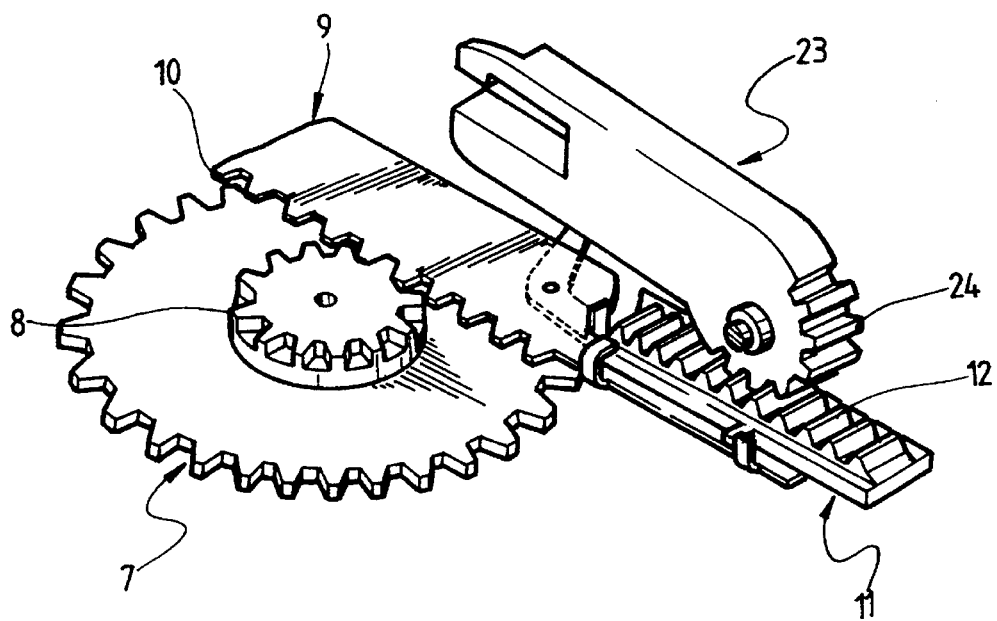
FIG. 3 is a perspective view of parts of the cassette loading apparatus shown in FIG. 1, illustrating the cassette-loaded state thereof.
Figure 4:
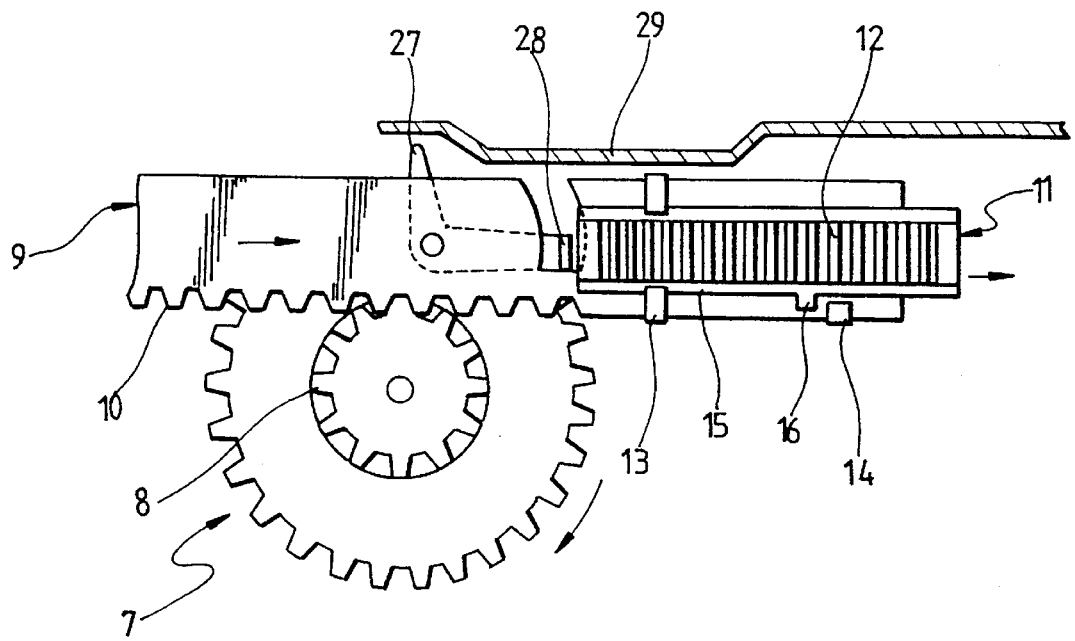
FIG. 4 is a plan view of parts of the cassette loading apparatus shown in FIG. 1, illustrating an intermediate stage of the cassette-ejected and cassette-loaded states.

Hereinafter, operation of the above-mentioned first embodiment will be explained with reference to FIGS. 2 to 5. FIG. 2 illustrates an eject state where the locking lever 27 is separated from the cam 29 and the bent portion 28 of the locking lever 27 is at the position where the bent portion 28 can push against the second slide member 11. That is, the first and second slide members 9 and 11 are locked so as to move forward together. In such a state, when a user inserts a cassette (not shown) into cassette holder 20 (FIG. 1), the motor 4 operates and the worm 5 rotates. A rotation torque of the worm 5 is delivered to the master gear 7 via the worm gear 6. At this time, the master gear 7 rotates clockwise. First slide member 9 moves forward due to the rotation of the master gear 7. Referring to FIG. 4, the bent portion 28 of the locking lever 27 pivot-supported to first slide member 9 pushes against the second slide member 11 and moves together with the second slide member 11. Arm gear 23 rotates as shown in FIG. 3, due to the movement of the second slide member 11, and the cassette holder 20 moves horizontally via the support guide pins 21 and 22 along the guide grooves 18 and 19 of guide bracket 17 and downwardly in accordance with the rotation of arm gear 23. Accordingly, the cassette held by cassette holder 20 is loaded into a reel driving table (not shown) on deck 1. When cassette loading ends, the locking lever 27 is pressed by the cam 29. Thus, the bent portion 28 deviates from second slide member 11 and the locking state of the first and second slide members 9 and 11 is removed.

Figure 5:
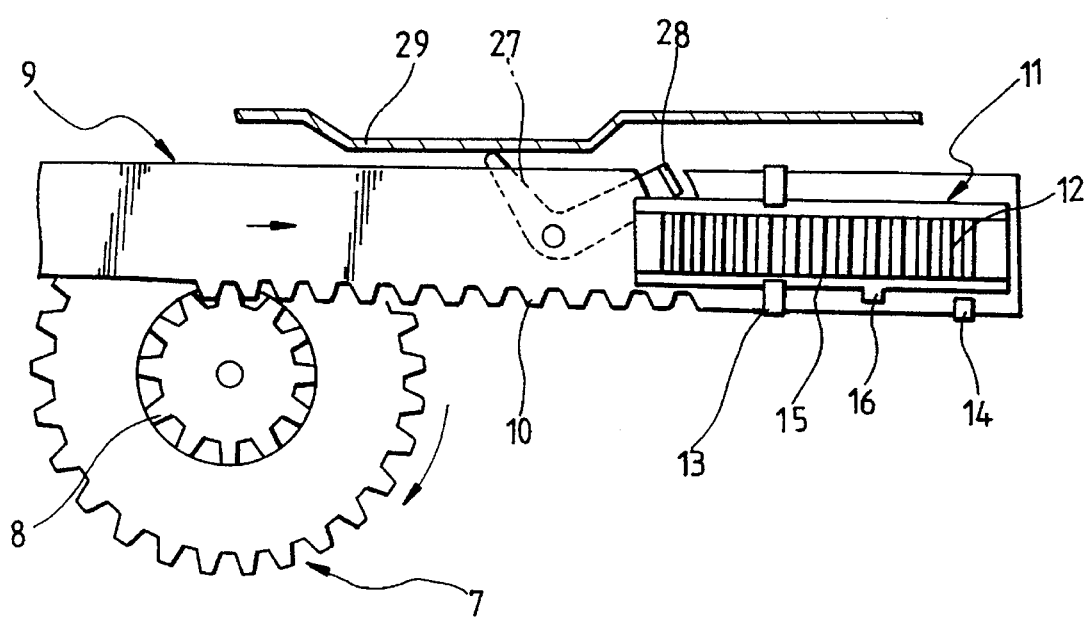
FIG. 5 is a plan view of parts of the cassette loading apparatus shown in FIG. 1, illustrating a post-cassette-loaded state thereof.

When driving of the motor continues as cassette loading ends, the first slide member 9 moves forward by the uninterrupted rotation of the master gear 7, as shown in FIG. 5. However, the second slide member 11 no longer moves. Accordingly, the driving force of the motor can be transmitted to each part of tape driving mechanism on deck 1 via the master gear 7 or first slide member 9 while maintaining the cassette loading state even when cassette loading ends.

When motor 4 is reversely rotated in order to eject a cassette loaded in deck 1, the master gear 7 rotates counterclockwise and the first slide member 9 moves backward due to the counterclockwise rotation of the master gear 7. As the first slide member 9 moves backward, a final tape unloading operation from deck 1 wherein the drawn out tape is re-wound onto the cassette is performed until stop 14, as shown in FIG. 5, comes into contact with protrusion 16 of second slide member 11. At this time, the second slide member 11 does not move, to thereby maintain the cassette loading state. After the tape unloading, when reverse rotation of the motor continues, the first and second slide members 9 and 11 are re-locked by the stop 14 and protrusion 16. Thus, first and second slide members 9 and 11 move backward together. Due to this backward movement of the second slide member 11, the arm gear 23 moves reversely from the state shown in FIG. 3, to thereby eject the cassette.

FIGS. 6 to 11 show a second embodiment of the present invention. A cassette loading apparatus according to the second embodiment uses a single slide member 30 instead of the first and second slide members of the first embodiment shown in FIG. 1. Slide member 30 comprises a first rack gear portion 31 coupled to a cam gear portion 8' of a modified master gear 7' and a second rack gear portion 32 coupled to a cam gear portion 24' of a modified arm gear 23'. First rack gear portion 31 of the slide member 30 is formed in part of the side surface of slide member 30 and includes a rack portion 31a having a predetermined width, and an extended tooth 31b and a control tooth 31c formed in one end of the rack portion 31a. A cam gear portion 8' of master gear 7' includes a gear portion 8a meshed with rack portion 31a, an extended tooth groove 8b and a control protrusion 8c which correspond to extended tooth 31b and control tooth 31c, respectively, and a cam portion 8d formed on the addendum circle of the gear portion 8a. Here, extended tooth groove 8b and control protrusion 8c of cam gear portion 8' and extended tooth 31b and control tooth 31c of the first rack gear portion 31 are for achieving smooth driving and gear connection between cam gear portion 8' and the first rack gear portion 31 at the beginning of cassette ejection (described later). Second rack gear 32 of the slide member 30 is formed in part of the upper surface of slide member 30 and includes a rack portion 32a, cam 32b and a control tooth groove 32c. Cam gear portion 24' of the arm gear 23' includes a gear portion 24a meshed with tooth portion 32a and a cam protrusion 24b and control tooth 24c which correspond to cam 32b and control tooth groove 32c, respectively. A spring 33 is installed in arm gear 23'. Here, cam protrusion 24b of the cam gear portion 24' and cam 32b of the second rack gear portion 32 and the spring 33 are for pressing a cassette holder at a cassette loading end point (described later). Control tooth 24c and control tooth groove 32c make for a smooth driving and gear connection between the second rack gear portion 32 and the cam gear portion 24' at the beginning of cassette ejection (described later).

Figure 7:
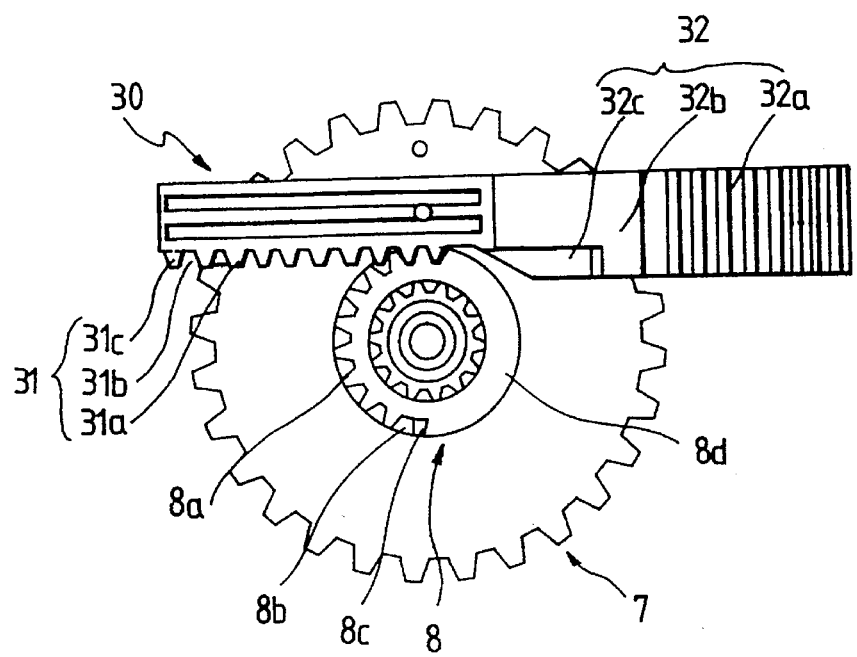
FIG. 7 is a plan view of parts of the cassette loading apparatus shown in FIG. 6, illustrating the cassette-ejected state thereof.
Figure 9:
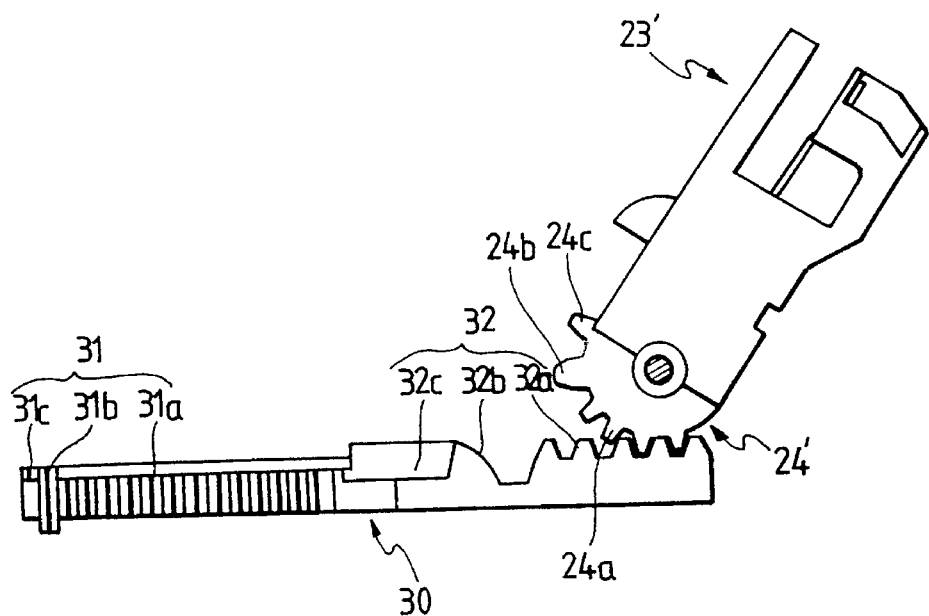
FIG. 9 is a side elevation view of parts of the cassette loading apparatus shown in FIG. 6, illustrating the cassette-ejected state thereof.
Figure 10:
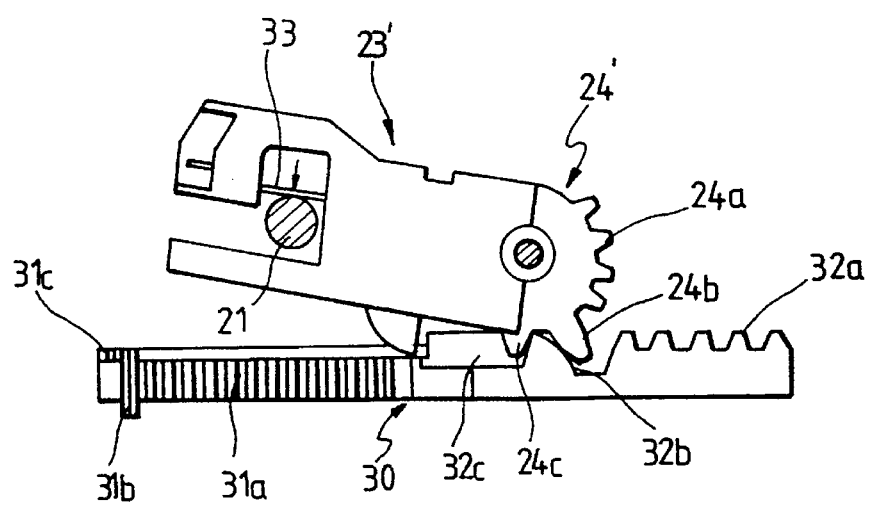
FIG. 10 is a side elevation view of parts of the cassette loading apparatus shown in FIG. 6, illustrating the cassette-loaded state thereof.

The second embodiment of the present invention will be explained with reference to FIGS. 7 to 11. FIGS. 7 and 9 illustrate a cassette-ejected state, FIGS. 8 and 10 illustrate a cassette-loaded state, and FIG. 11 illustrates the state after cassette loading is performed.

Figure 6:
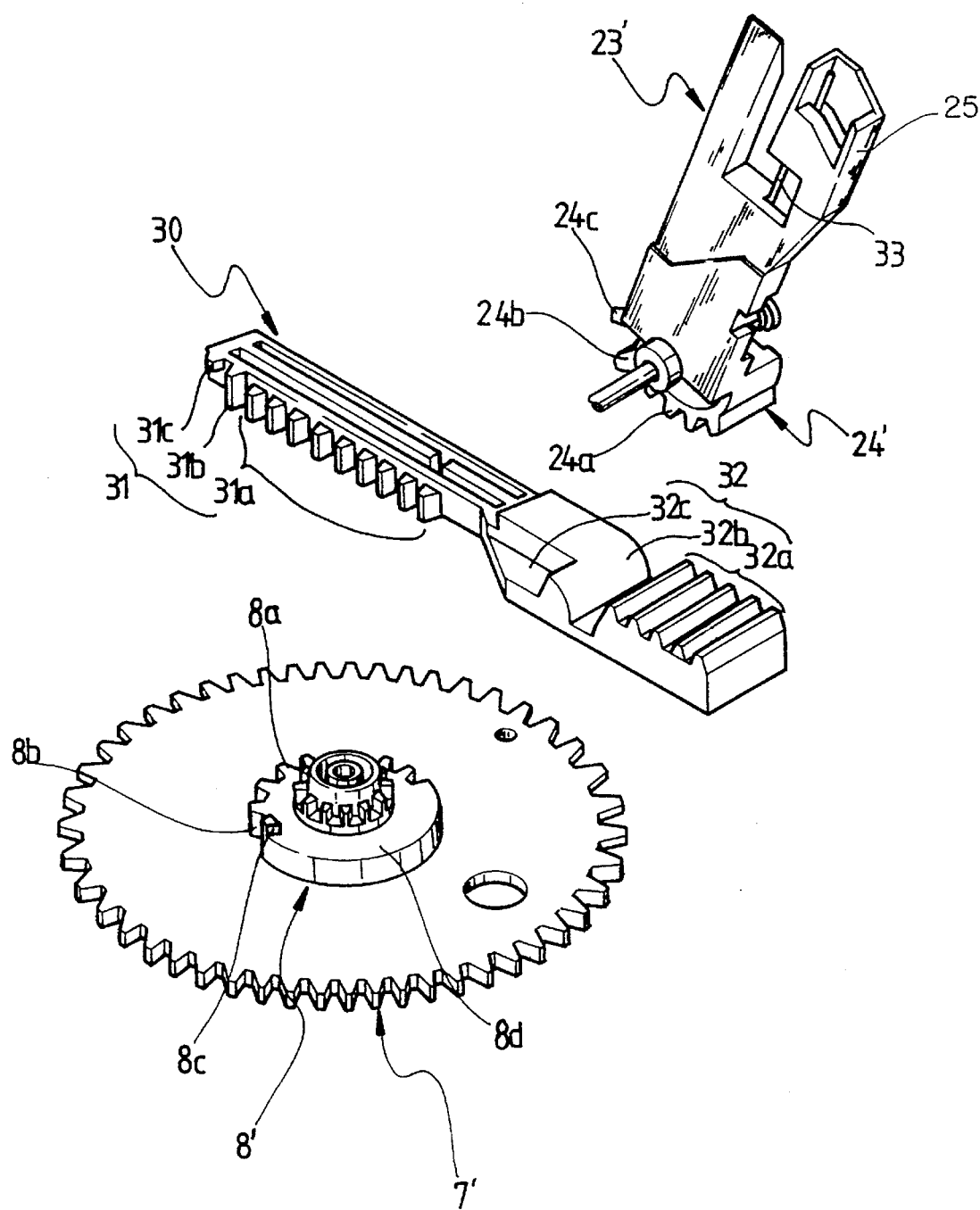
FIG. 6 is a partially exploded perspective illustration of a cassette loading apparatus according to another embodiment of the present invention.
Figure 8:
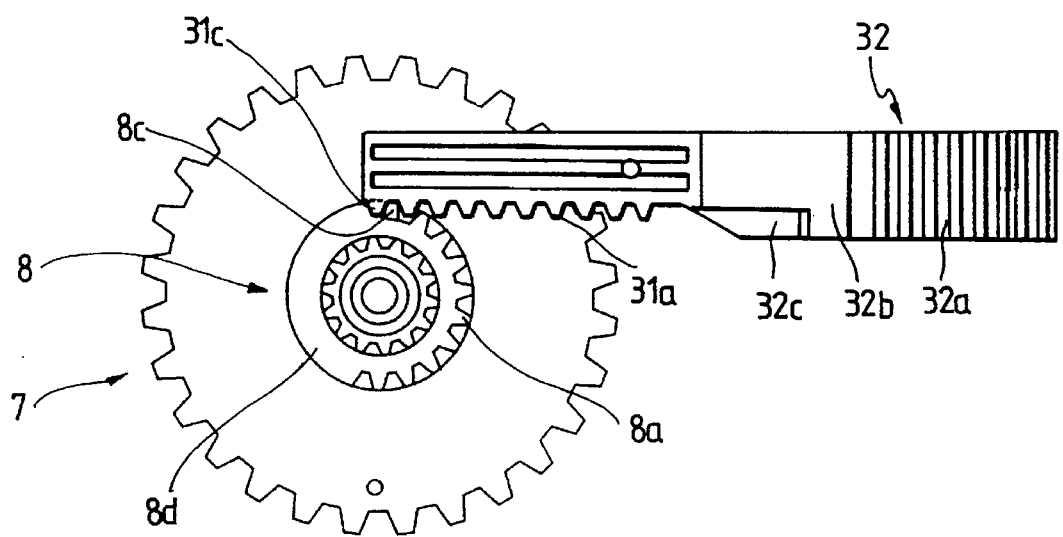
FIG. 8 is a plan view of parts of the cassette loading apparatus shown in FIG. 6, illustrating the cassette-loaded state thereof.

In FIGS. 6 and 8, slide member 30 moves forward due to the counterclockwise rotation of master gear 7' and arm gear 24' rotates due to the movement of slide member, to thereby perform a cassette loading operation. When cassette loading ends, cam protrusion 24b of arm gear 24' is pressed by cam 32b of second rack gear portion 32 of slide member 30. Thus, a guide pin 21 of cassette holder 20 coupled to arm portion 25' is pressed by spring 33. Accordingly, the cassette can be loaded stably and with no vertical wobble.

In a cassette loading state as shown in FIG. 8, one end of the first rack gear portion 31 of the slide member 30 (see portion below control tooth 31c in FIGS. 9 and 10) deviates from gear portion 8a of cam gear portion 8' and is placed on cam portion 8d. Accordingly, as shown in FIG. 11, master gear 7' can be rotated or raced with respect to the slide member 30 while maintaining the cassette loading state. In other words, the drive force of the above-described motor can be transmitted to each driven portion on the deck by using the racing action of master gear 7'.

Figure 11:
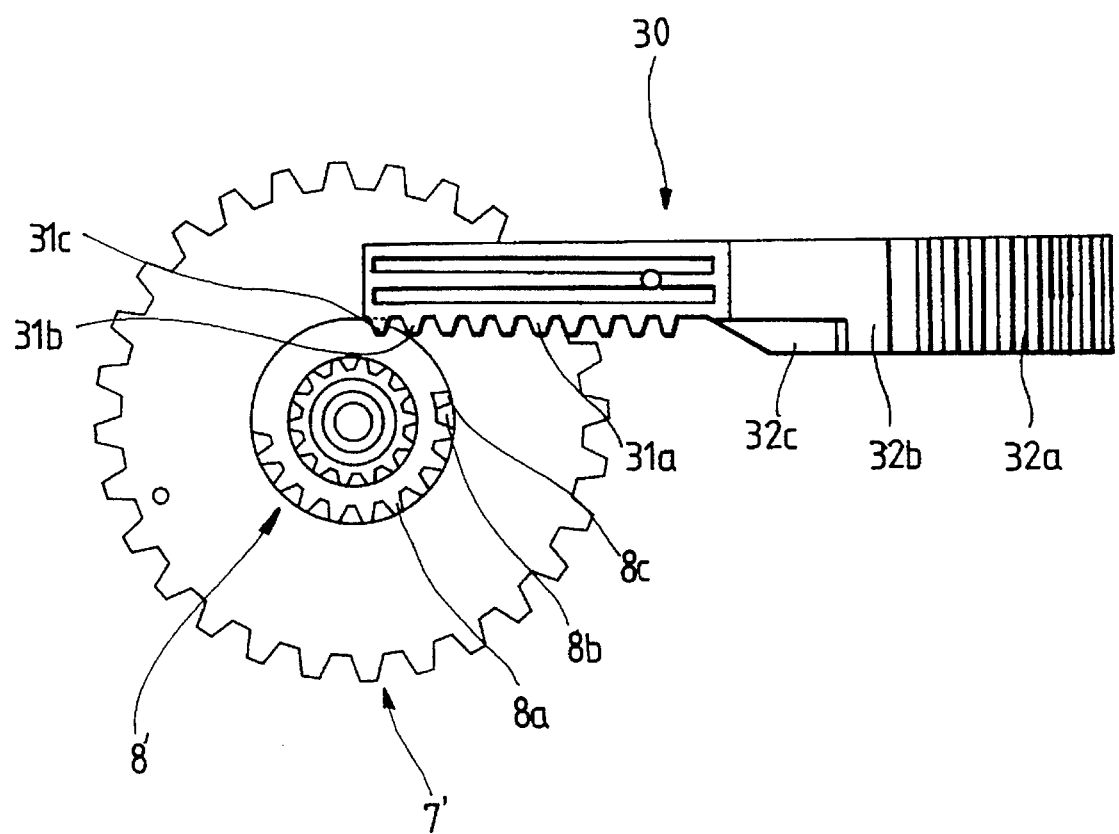
FIG. 11 is a plan view of parts of the cassette loading apparatus shown in FIG. 6, illustrating a post-cassette-loaded state thereof.

Then, in the state shown in FIG. 11, when master gear 7' is rotated clockwise, the final tape unloading operation is performed until control protrusion 8c comes into contact with control tooth 31c of slide member 30. Then, slide member 30 moves backward due to a reverse rotation of master gear 7' resulting from the previous process. Then, arm gear 23' rotates due to the backward movement of slide member 30, to thereby perform the cassette eject operation. As shown in FIG. 8, at the beginning of cassette ejection, control protrusion 8c of master gear 7' pushes control tooth 31c of slide member 30. Therefore, connection between extended tooth groove 8b and extended tooth 31b and between gear portion 8a and rack portion 31b is made easy. In addition, extended tooth groove 8b and extended tooth 31b make for a large torque transmitted therebetween. Meanwhile, second rack gear portion 32 of slide member 30 and cam gear portion 24' of arm gear 23' can be easily connected by control tooth 24c and control tooth groove 32c. Accordingly, cassette ejection can be performed smoothly in the beginning of cassette ejection. In the second embodiment of the present invention, a single slide member 30 is employed, which provides for a simpler cassette loading apparatus.

As described above, the present invention is to provide a cassette loading apparatus having a simple structure and which uses one or two slide members in driving a cassette loading mechanism by employing a motor installed in a tape driving mechanism. Thus, assembly is easily carried out and there is little loss of the motor's driving force. Specifically, a quick loading operation is enabled.

It is contemplated that numerous modifications may be made to the cassette loading apparatus of the present invention without departing from the spirit and scope of the invention as defined in the following claims.

What is claimed is:

1. A cassette loading apparatus, including a cassette holder for receiving a cassette, and a motor for generating a driving force, and which moves said cassette holder by the driving force of said motor, so as to load the cassette onto a deck for travelling a tape from reel to reel in the cassette, said cassette loading apparatus comprising:

a master gear coupled to and rotated by said motor;

a first slide member having a first rack gear coupled to said master gear, and being moved by the rotation of said master gear;

a second slide member having a second rack gear, and being supported by and movable on said first slide member;

an arm gear which is meshed with the second rack gear of said second slide member and coupled to said cassette holder, and which rotates in accordance with the movement of said second slide member and thereby moves said cassette holder; and means for locking said first and second slide members so as to move together in a locked state during cassette loading and ejecting, and for releasing the locked state after cassette loading, thereby to permit said first slide member to move while the second slide member remains stationary, such that the driving force of said motor is transmitted to at least one other driven portion on the deck via one of said master gear and said first slide member.

2. The cassette loading apparatus according to claim 1, wherein said first slide member further comprises a guide protrusion for guiding said second slide member, and said second slide member further comprises a guide rail for receiving said guide protrusion.

3. The cassette loading apparatus according to claim 1, wherein said locking and lock releasing means comprises:

a locking lever having a bent portion at one end for locking said second slide member in one direction, and which is pivot-supported on said first slide member and biased so that said bent portion is at a position to lock said second slide member;

a cam for engaging with said locking lever at a predetermined location such that the bent portion of said locking lever releases the hold on said second slide member;

a stop formed on said first slide member, for locking said second slide member in another direction; and a protrusion formed on said second slide member and operative to catch on said stop.

4. A cassette loading apparatus, including a cassette holder for receiving a cassette, and a motor for generating a driving force, and which moves said cassette holder by the driving force of said motor, so as to load the cassette onto a deck for travelling a tape from reel to reel in the cassette, said cassette loading apparatus comprising:

a master gear coupled to and rotated by said motor;

a slide member having a first rack gear and a second rack gear, said first rack gear being coupled to said master gear so as to move by the rotation of said master gear, said second rack gear including a tooth portion, a cam, and a control tooth groove;

an arm gear which is meshed with said second rack gear of said slide member and coupled to said cassette holder, and which rotates in accordance with the movement of said slide member and thereby moves said cassette holder to a cassette loading state, said arm gear including a gear portion which is meshed with said tooth portion of said second rack gear, and a cam protrusion and a control tooth which correspond to said cam and said control tooth groove, respectively, of said second rack gear; and means for permitting said master gear to rotate relative to said first rack gear such that said slide member does not move, the relative rotation of said master gear permitting the driving force of said motor to be transmitted to at least one other driven portion on the deck, while maintaining the cassette loading state, wherein said means for permitting said master gear to rotate relative to said first rack gear comprises a cam gear having a gear portion and a cam portion, in which said gear portion of said cam gear is formed on part of the circumference of said master gear so as to be meshed with said first rack gear of said slide member during cassette loading, and said cam portion is formed on a remaining portion of the circumference.

* * * * *